United States Patent [19]

Ziegler

[11] 3,998,051
[45] Dec. 21, 1976

[54] SUSTAINER-INJECTOR SLOT-ALIGNMENT
[75] Inventor: Walter E. Ziegler, Santa Monica, Calif.
[73] Assignee: The United States of America as represented by the Secretary of the Army, Washington, D.C.
[22] Filed: Jan. 2, 1975
[21] Appl. No.: 538,051
[52] U.S. Cl. .............................. 60/258; 239/424.5; 239/417; 239/558; 239/600
[51] Int. Cl.² ...................... F02K 9/02; B05B 7/06
[58] Field of Search .................... 60/39.74 A, 258; 239/600, 424.5, 425, 416.5, 417, 558, 568, 460

[56] References Cited
UNITED STATES PATENTS

| 2,396,449 | 3/1946 | Wahlin | 239/460 |
| 2,812,977 | 11/1957 | Phillips | 239/600 |
| 2,935,265 | 5/1960 | Richter | 239/600 |
| 3,074,231 | 1/1963 | Klein | 239/417 |
| 3,232,049 | 2/1966 | Rhodes | 60/39.74 A |
| 3,387,791 | 6/1968 | Allenbaugh | 239/460 |

Primary Examiner—William L. Freeh
Assistant Examiner—Robert E. Garrett
Attorney, Agent, or Firm—Nathan Edelberg; Robert P. Gibson; James T. Deaton

[57] ABSTRACT

A sustainer-injector in which fuel core and oxidizer ring members have the slots thereof predeterminely aligned by being keyed together through an intermediate pintle member and with the oxidizer ring being adjustably mounted relative to the pintle and fuel slots. The keying is accomplished by means of machine tabs on the pintle member which engage female slots machined on the fuel core and oxidizer ring members. The oxidizer ring is adjustably mounted relative to the fuel core and pintle member by having means at one side thereof for causing the oxidizer ring to be positioned linearly relative to the pintle member and the fuel core member.

6 Claims, 3 Drawing Figures

SUSTAINER-INJECTOR SLOT-ALIGNMENT

BACKGROUND OF THE INVENTION

The alignment of core fuel slots to oxidizer ring slots is critical in attaining stable and efficient sustainer combustion and the slot alignment at present is accomplished by optically aligning lines scribed on the fuel core and the oxidizer ring. The scribed lines are aligned to their respective propellant slots, but the capability of the optical alignment procedure to meet the prescribed alignment requirement is questionable. This is true since rotational movement of either the fuel core or the oxidizer ring results in slot misalignment and creates a disastrous instability condition. Therefore, a need exists in which the fuel core and oxidizer ring can have the slots thereof always aligned and still have the capability of having the oxidizer ring adjustable relative to the fuel core.

Therefore, it is an object of this invention to provide a sustainer-injector in which the fuel core and oxidizer ring can be accurately aligned to have the fuel slots-oxidizer slots always accurately aligned.

Another object of this invention is to provide a device in which slot misalignment is prevented due to shipping or firing.

Still another object of this invention is to provide finer adjustment of the oxidizer ring position due to the oxidizer ring not having to be rotated in installation.

A still further object of this invention is to provide an oxidizer ring that due to its mounting can be made with closer tolerances and therefore with smaller O-rings and by this arrangement reduce gaps and the possibility of gas leakage.

Still other objects and advantages of applicant's invention will be obvious to those skilled in this art.

SUMMARY OF THE INVENTION

In accordance with this invention, a sustainer-injector is provided that includes a housing that has an opening or cavity in one surface and a central bore with a pintle member mounted in said opening, a fuel ring telescoped with said pintle member and into said bore of said housing structure to secure said pintle member and said fuel ring to said housing and an outer oxidizer ring that is adjustably mounted relative to said fuel ring and said pintle member and is secured to said housing by securing means. The fuel ring and oxidizer ring are keyed to the pintle by slots in the oxidizer ring and fuel ring that mate with tabs on said pintle member to align oxidizer and fuel slots in the oxidizer and fuel rings relative to each other. The oxidizer ring has a nut thereon or shims for allowing adjustment of the oxidizer ring relative to the housing and thereby adjustment relative to the pintle member and the fuel ring.

DESCRIPTION OF THE PREFERRED EMBODIMENT

Figure 1:
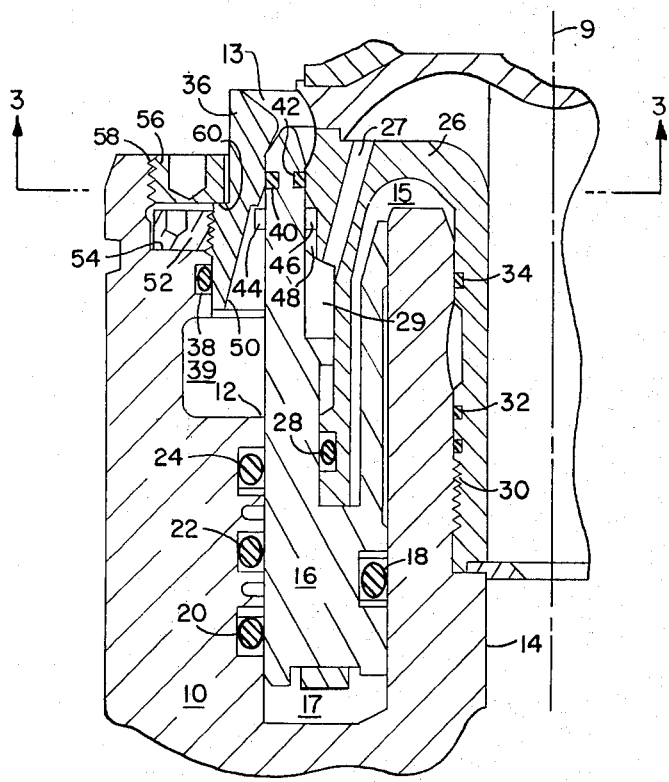
FIG. 1 is a sectional view partially cut away of one side of a sustainer-injector according to this invention.

Referring now to FIG. 1, one side of a sustainer-injector according to this invention is indicated by center line 9 and includes a housing 10 with stepped opening or cavity 12 therein and bore 14 therethrough for the passage of fuel. A cylindrical pintle member 16 is slidably mounted in opening 12 for controlling oxidizer and fuel flow through circumferential passage 13 directly into a rocket motor combustion chamber (not shown). Seal 18 seals pintle member 16 relative to one surface of opening 12 and body member 10 has seals 20, 22 and 24 therein for sealing the opposite side of pintle member 16 to define chamber 17 for having fluid pressure bias pintle member 16 in a closing direction. Core assembly 26 has a cylindrical outer surface sealed to pintle member 16 by seal 28, to define fuel chamber 29 with pintle member 16 and an inner portion of core assembly 26 is threaded into bore 14 at 30. Seals 32 and 34 seal core assembly 26 relative to inner bore 14 to define chamber 15 for having fluid pressure bias pintle member 16 in an opening direction. A plurality of passages 27 communicate fuel from bore 14 to fuel chamber 29. An oxidizer ring 36 is slidably mounted relative to opening 12 of housing 10 and pintle member 16. A seal 38 seals between an outer cylindrical surface of oxidizer ring 36 and housing 10 and seal 40 seals between pintle member 16 and oxidizer ring 36 to define oxidizer chamber 39. Seal 42 seals between pintle member 16 and core assembly 26. Pintle member 16 has tabs 44 and 46 thereon that are engaged in slots 48 and 50 of core assembly 26 and oxidizer ring 36 to accurately align the passages thereof relative to each other. Oxidizer ring 36 has nut 52 threadly mounted thereon to allow oxidizer ring 36 to be adjusted linearly relative to pintle member 16 and core assembly 26 and nut 52 bears against shoulder 54 of opening 12. Locking nut 56 is threaded into threads 58 of housing 10 and rests on shoulder 60 of oxidizer ring 36 to hold oxidizer ring 36 in assembled and secured position.

Figure 3:
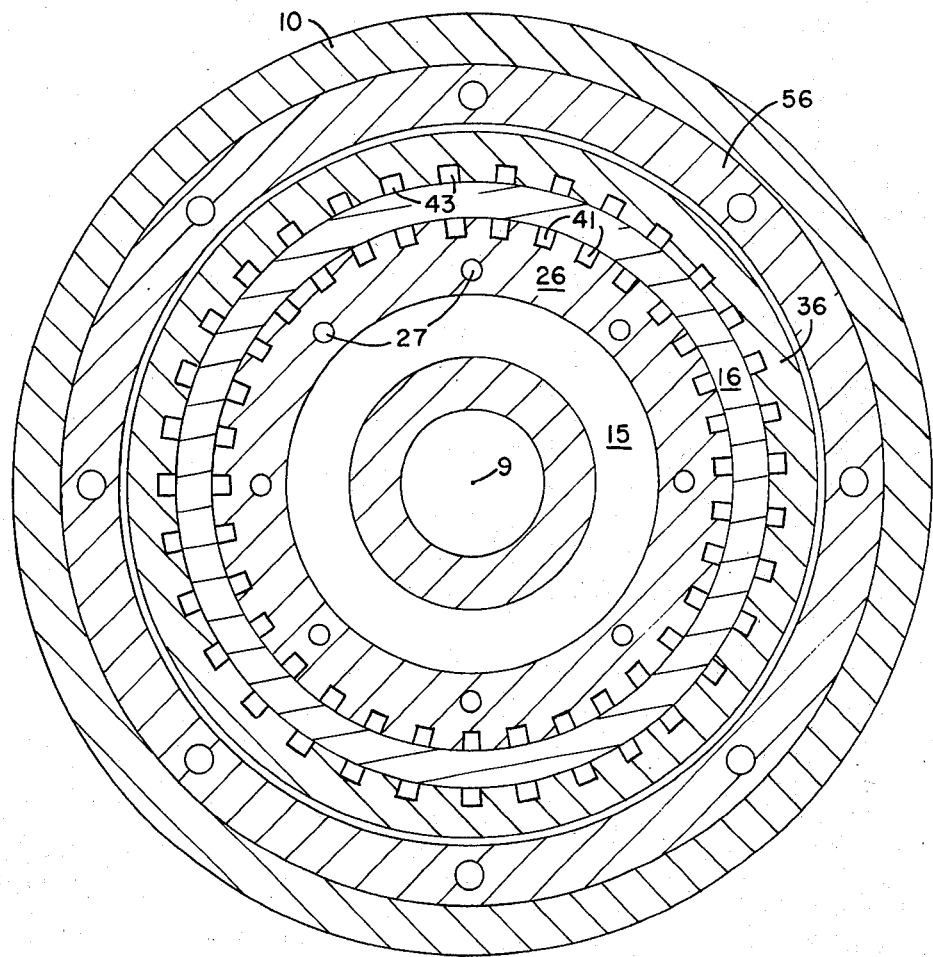
FIG. 3 is a view taken along line 3-3 of FIG. 1 and showing an entire cross section of the sustainer-injector.

With this arrangement, since the several members are slidably mounted relative to each other, closer tolerances can be maintained and smaller seals can be used. Also, with the keying arrangement of the pintle member to the core assembly and the oxidizer ring, fuel slots 41 and oxidizer slots 43 (see FIG. 3) can be accurately aligned in a predetermined relationship since the slots of the core assembly and those of the oxidizer ring are always in a predetermined aligned position since these members with the keyed arrangement slide relative to each other rather than being rotatably mounted relative to each other. Also, adjustable nut 52 of oxidizer ring 36 enables one to accurately adjust oxidizer ring 36 relative to pintle member 16 and core assembly 26.

In operation, fuel flow through bore 14, to and through passages 27 and into fuel chamber 29 is controlled through conventional control means (not shown). At the same time, oxidizer is supplied to oxidizer chamber 39 through conventional control means and passages (not shown). Appropriate fluid pressures are also controlled by conventional means for chambers 15 and 17 to cause pintle member 16 to be adjusted relative to fuel slots 41 and oxidizer slots 43 and control or throttle oxidizer and fuel flow into circumferential passage 13 and finally to the combustion chamber (not shown).

Figure 2:
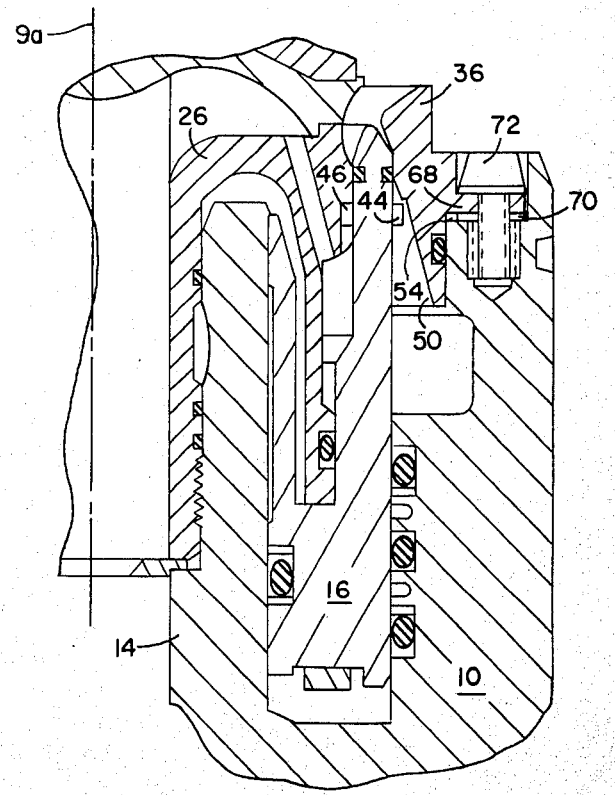
FIG. 2 is a sectional view partially cut away and illustrating another sustainer-injector embodiment according to this invention.

Referring now to FIG. 2, one side of another embodiment of the invention, indicated by center line 9a is disclosed that is the same as that for FIG. 1 except for the adjusting means for cylindrical oxidizer ring 36. In this embodiment, cylindrical oxidizer ring 36 has a circumferential flange 68 thereon and variable width shims or washers 70 that can be placed between flange 68 and ledge 54 to adjustably mount oxidizer ring 36. A plurality of bolts 72 are circumferentially arranged around housing 10 and are used to secure oxidizer ring 36 to housing 10.

Therefore, in this embodiment, it can be readily seen that oxidizer ring 36 can be adjusted linearly by inserting thicker or thinner shims or washers 70 or by a plurality of shims or washers 70.

I claim:

1. A sustainer-injector comprising a housing having a bore therethrough and a cavity therein at an end thereof and co-axially of said bore, a cylindrical pintle member slidably mounted as a piston in a portion of said cavity, a core assembly secured in said bore of said housing and slidably and sealably mounted at an inner surface of said pintle member, an oxidizer ring slidably mounted at an inner surface to an outer surface of said pintle member and secured to seal said cavity of said housing structure at an outer surface of said oxidizer ring, means keying said core assembly and said oxidizer ring in a predetermined relationship relative to said pintle member for linear movement of said oxidizer ring relative to said core assembly and said pintle member, and adjusting means mounting said oxidizer ring in said housing for linear adjustment relative to said housing and said pintle member to allow said oxidizer ring to be adjusted linearly relative to said pintle member and said core assembly.

2. A sustainer-injector as set forth in claim 1, wherein said adjusting means includes a nut threadly mounted on threads at the outer surface of said oxidizer ring and mounted against a shoulder in said housing.

3. A sustainer-injector as set forth in claim 1, wherein said adjusting means includes a flange on said oxidizer ring, shim means between said flange and a ledge on said housing, and bolt securing means securing said oxidizer ring to said housing.

4. A sustainer-injector as set forth in claim 2, wherein said keying means includes tabs on said pintle member that are engaged in slots on said core assembly and said oxidizer ring to align the core assembly and oxidizer ring relative to each other.

5. A sustainer-injector as set forth in claim 4, wherein seal means are provided between said pintle member and said core member and seal means are provided between said pintle member and said core assembly to seal said members relative to each other.

6. A sustainer-injector as set forth in claim 2, wherein said oxidizer ring is secured to said housing structure by a cylindrical locking nut threaded into threads on said housing at said cavity and by said locking nut bearing on a shoulder at said outer surface of said oxidizer ring to secure said oxidizer ring in said housing.

* * * * *